(12) United States Patent
Gregg et al.

(10) Patent No.: US 8,290,179 B2
(45) Date of Patent: Oct. 16, 2012

(54) MULTIPLE-USE ACOUSTIC PORT

(75) Inventors: Justin Gregg, San Francisco, CA (US);
Michael M. Lee, San Jose, CA (US);
Chad Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 1090 days.

(21) Appl. No.: 12/196,171

(22) Filed: Aug. 21, 2008

(65) Prior Publication Data
US 2010/0046771 A1    Feb. 25, 2010

(51) Int. Cl.
*H03G 5/00* (2006.01)

(52) U.S. Cl. ............................. 381/98; 381/107; 381/150

(58) Field of Classification Search .................... 381/98, 381/107, 150
See application file for complete search history.

(56) References Cited

U.S. PATENT DOCUMENTS

| | | | | |
|---|---|---|---|---|
| 6,374,120 B1 * | 4/2002 | Krauss | ........................ | 455/550.1 |
| 7,957,541 B2 * | 6/2011 | Edgren et al. | .................... | 381/89 |
| 2002/0191807 A1 * | 12/2002 | Asada et al. | ................... | 381/335 |
| 2005/0096103 A1 * | 5/2005 | Eaton et al. | ................ | 455/575.1 |
| 2010/0046766 A1 * | 2/2010 | Gregg et al. | ..................... | 381/59 |

* cited by examiner

*Primary Examiner* — Phuc Dang
(74) *Attorney, Agent, or Firm* — Kilpatrick Townsend & Stockton LLP

(57) ABSTRACT

Two or more acoustic transducers share the same acoustic port in a device. The acoustic properties—such as acoustic impedance and frequency response—of the shared acoustic port are matched to each of the two or more acoustic transducers. To accomplish acoustic impedance matching, a separate back volume is provided for each of the acoustic transducers, matched to that transducer. Frequency response matching can be accomplished by the design of the transducer itself, but also by providing an adjacent element in the acoustic system of the transducer. One transducer may serve as an element in the acoustic system of another transducer. Frequency response adjustment of an individual element may also affect acoustic impedance of the entire port-transducer system.

31 Claims, 3 Drawing Sheets

MULTIPLE-USE ACOUSTIC PORT

BACKGROUND OF THE INVENTION

This invention relates to a device having multiple acoustic transducers that may share a single acoustic port.

In order for the sound generated or received by an acoustic transducer of a device to propagate between the transducer and the outside of the casing of the device (in either direction), an acoustic port or vent, typically in the form of a hole or grille, is typically provided in the casing. Devices may have multiple acoustic transducers. For example, a mobile telephone may have both an earpiece speaker (hereinafter referred to as a "receiver") and a speakerphone or hands-free speaker (hereinafter referred to as a "speaker"), as well as a microphone. Similarly, a media player may have multiple speakers for stereo sound reproduction at different frequency ranges (e.g., woofers for bass frequencies).

As a definitional matter, "transducer" as used herein refers to a physical element that vibrates, rather than to any associated electrical element. Thus, a multi-coil speaker, for example, that has one cone or membrane but two or more driver coils, is considered one transducer.

Providing a separate acoustic port for each transducer may adversely affect the appearance of the device, and may even compromise structural integrity if the number of transducers is large. Additionally, each transducer is normally associated with a front acoustic volume and a back acoustic volume. Each acoustic port, front volume and back volume should be designed to provide an acoustic impedance and frequency response that match their associated transducer. If the number of transducers is large, having a front volume, back volume and port tuned to each transducer may be impractical in small handheld devices, such as mobile telephones or multi-media devices.

SUMMARY OF THE INVENTION

The present invention allows two or more acoustic transducers to share the same acoustic port in a device. This may be accomplished by tuning the acoustic impedance and frequency response of the shared acoustic port so that they match those of each of the two or more acoustic transducers. Acoustic impedance matching may include the creation of acoustic resonance. Some or all of the transducers' associated front volumes may be shared by the transducers sharing an acoustic port. Therefore, to accomplish the acoustic impedance matching, a separate "back volume" is provided for each of the acoustic transducers, matched to that transducer.

The frequency response matching can be accomplished by the design of the transducer itself, but also by providing an adjacent element in the acoustic system of the transducer. In accordance with embodiments of the invention, one transducer may serve as an element in the acoustic system of another transducer.

In addition, some of a transducer's associated front volume may be adjusted to tune the acoustic impedance and/or frequency response, in addition to channeling sound to the acoustic port.

Because two or more transducers are sharing part or all of a single acoustic front volume and channel to the shared port, each transducer is exposed to the acoustic pressure output by each other transducer. Accordingly, each transducer should be designed so that its cone or diaphragm can withstand the total acoustic pressure that may be output by any one or more of the other transducers.

Therefore, in accordance with the present invention, there is provided an audio device including a housing, an acoustic port in the housing, and a plurality of acoustic transducers sharing that acoustic port. The said acoustic port has at least one acoustic property, each of the plurality of acoustic transducers has at least one of those acoustic properties, the at least one of those acoustic properties of each of the plurality of acoustic transducers is matched to a corresponding one of those acoustic properties of the acoustic port.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
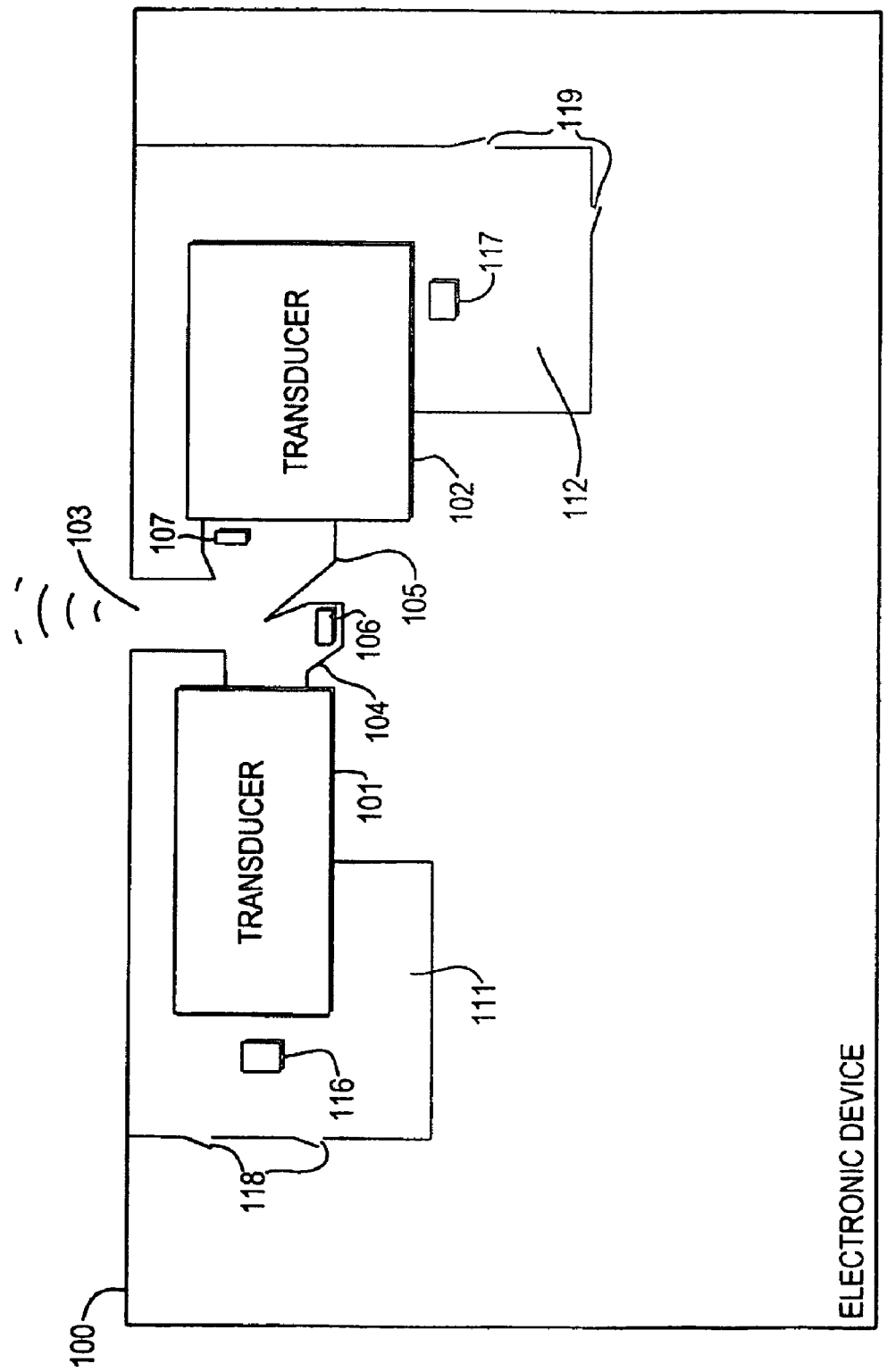
FIG. 1 is a block diagram of the interior of an electronic device having two acoustic transducers sharing a single port in accordance with the present invention.

In accordance with this invention, two or more acoustic transducers in a device may share a single acoustic port. The acoustic transducers can include microphones, speakers, piezoelectric transducers, electromagnetic transducers, or any other acoustic input or output device. Certain types of transducers, such as certain speakers, may have multiple coils driving a single membrane or cone; for purposes of the present invention, each such transducer is considered a single transducer.

For example, in a mobile telephone, an earpiece speaker (hereinafter referred to as a "receiver") and a speakerphone or "handsfree" speaker (hereinafter referred to as a "speaker") may share a single acoustic port. Similarly, as another example, in a media player having two stereo acoustic ports, each of those ports may be shared by one speaker for most frequencies and a second speaker limited to bass frequencies (i.e., a woofer). In both of these examples, two transducers are sharing a single port, but there also may be cases where some other number of transducers share a port.

Each of the transducers has its own acoustic properties, and each acoustic port has its own acoustic properties. For best acoustic performance, each acoustic transducer should be matched to the acoustic impedance and frequency response of its associated acoustic port. The acoustic impedance and frequency response of the transducer-port system may be affected by its associated front volume and back volume.

The front volume is cavity between the transducer and the acoustic port. The acoustic impedance of the transducer-port system is affect by the size, shape and loading of this front volume. This front volume inherently also includes some of the volume in front of the port on the outside of the device. For example, in the case of a mobile telephone receiver, the presence or absence of the user's face will affect the front volume and thus change the acoustic impedance of the transducer-port system. When one of more transducers share the same acoustic port, part or all of the associated front volume is then also shared.

In a system in which one transducer is associated with one acoustic port, matching the acoustic properties of each transducer to those of the corresponding port may be done by changing the transducer, the port, and/or the associated front and back volumes. In accordance with the present invention, when one or more transducers share an acoustic port, tuning of acoustic properties accounts for shared volumes and interactions between the elements in the system. As such, changes may be made to elements other than either the transducer or the port (e.g., to other elements in the acoustic system of the transducer, or to back volumes), because such changes may have less effect on other transducers in the shared system.

One way to match the acoustic impedance is to adjust the back volume associated with each transducer —i.e., the cavity inside the housing behind the transducer. Specifically, both the volumetric size, and the shape, of the back volume are designed to help match the acoustic impedance of the transducer and the port. For example, the acoustic output power of a transducer in lower audible frequencies may be enhanced by increasing the associated acoustic back volume. Further, specific acoustic frequencies may be enhanced or degraded by the addition of elements such as resonators or absorbers in the associated back volume to adjust the frequency response.

The transducer provides an acoustic impedance which shields these back volume tuning mechanisms from having significant effect on other transducers in the larger system in accordance with the present invention. This shielding effect makes changing the back volume to tune the system more appealing, in most cases, than changing the front volume or the acoustic port, which are fully or partially shared. However, in other cases, transducers sharing an acoustic port may require similar tuning. In such cases, it may be desirable to tune the system by changing the front volume or the acoustic port.

Where there is at least one other transducer nearby, the other transducer or transducers also may act as elements that affect tuning, and the design of any such transducer may take into account its serving as an element in the acoustic system of another transducer. For example, in the mobile telephone example, a microphone may be able to serve as an element in the acoustic system of a speaker, if they are near one another. It also may be possible for a speaker to serve as an element in the acoustic system of a receiver or vice versa. Each transducer in the shared port system may act, at least partially, as an element in the acoustic systems of other transducers in the system.

Another reason why the presence of one or more other transducers might affect the design of a particular transducer is that with the other transducers nearby, the membrane or cone of the particular transducer may be subject to acoustic pressure from the output of the other transducers. Therefore, each transducer preferably is designed so that its membrane or cone can withstand any acoustic pressure to which it is expected to be exposed. This can be determined by directly measuring output pressure at the opening of the port. The pressure at each transducer in the system can then be calculated. Alternatively, the entire system can be modelled using computer simulation to determine the expected pressures.

An example of an electronic device 100 incorporating the present invention is provided in FIG. 1. Electronic device 100 may be, for example, a mobile telephone, and transducers 101, 102, which share acoustic port 103, may be a receiver and a speaker, respectively. Because they share port 103 itself, the combined front volumes 104, 105, and any contributions to the front volume outside port 103 (such as the space between port 103 and a user's ear), the acoustic impedance of each transducer 101, 102 may be matched to port 103 using other characteristics, such as the characteristics of back volumes 111, 112. Each respective transducer 101, 102 preferably has a respective back volume 111, 112. In accordance with the present invention, the size and shape of each respective back volume 111, 112 preferably is adjusted so that the acoustic impedance of each transducer 101, 102 is matched to port 103. Either or both of back volumes 111, 112 also may includes optional vents 118, 119 that may further affect their acoustic properties. Although only two transducers are shown, port 103 also may be shared by three or more transducers, all of whose back volumes may be adjusted accordingly.

Figure 2:
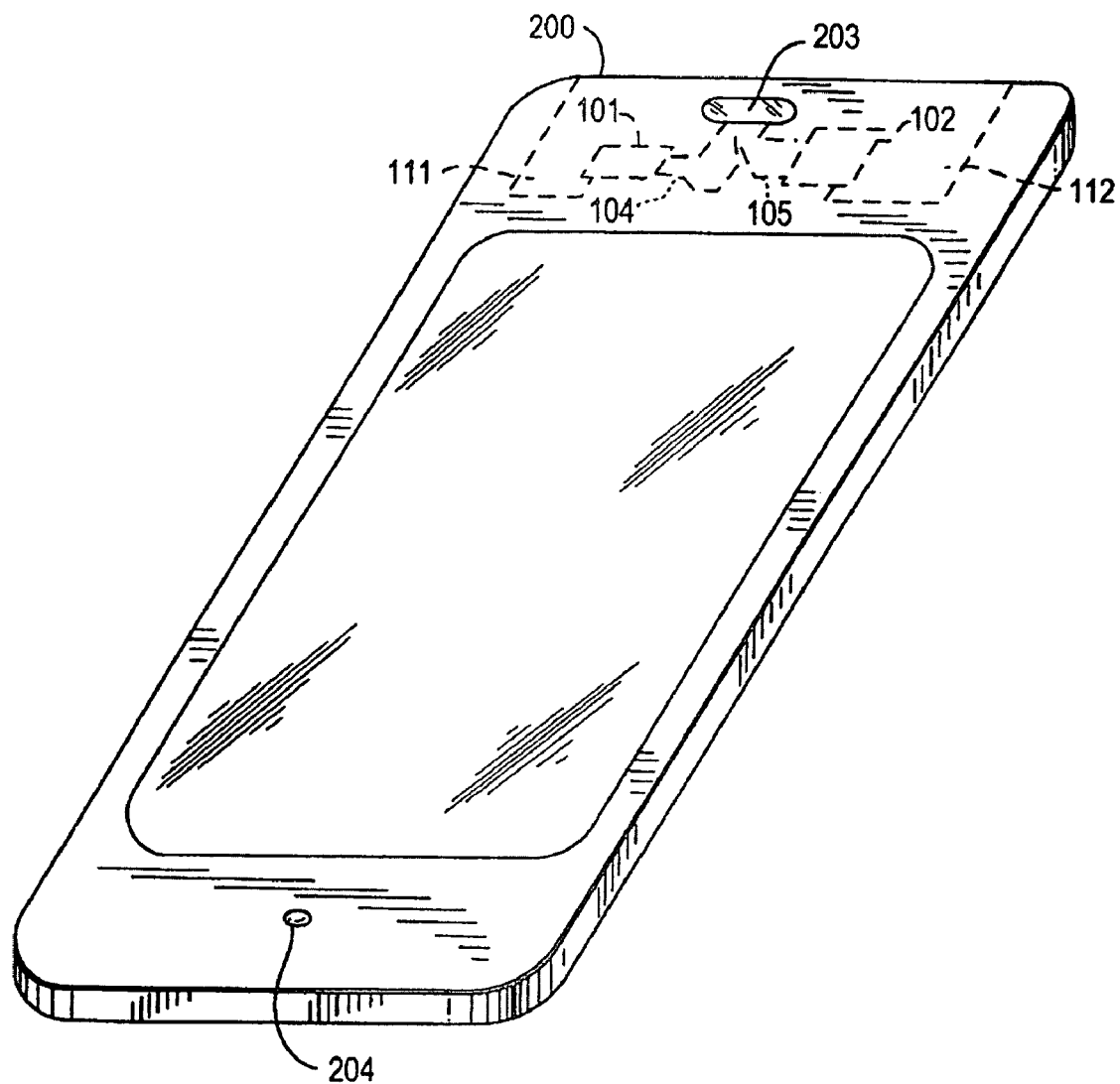
FIG. 2 is an exterior view of an electronic device having two acoustic transducers sharing a single port in accordance with a first embodiment of the present invention.

As shown in FIG. 2, device 101 may be a mobile telephone 200, and transducers 101, 102 may be a receiver and a speaker behind earpiece port 203. In this embodiment, a microphone (not shown) is located behind a separate port 204.

Figure 3:
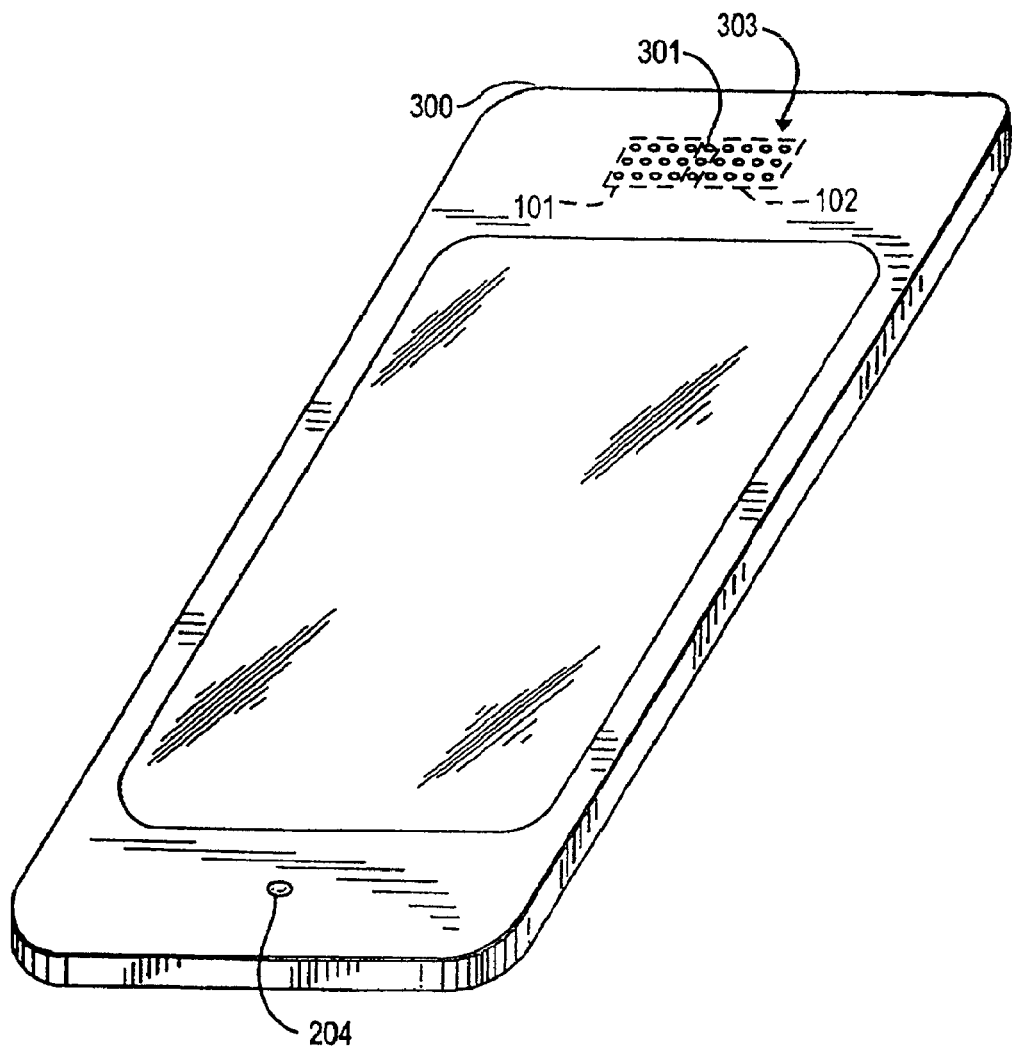
FIG. 3 is an exterior view, similar to FIG. 2, of an electronic device having two acoustic transducers sharing a single port in accordance with a second embodiment of the present invention.

In an alternative embodiment 300 shown in FIG. 3, which is a mobile telephone similar to mobile telephone 200, acoustic port 303 may be a microperforated grill-like structure not readily visible to the naked eye (microperforations 301 are exaggerated for illustration), with the transducers 101, 102 located behind different portions of the microperforated area. In this example, the front volume characteristics of transducers 101, 102 would be expected to be the same, although it is possible to make them different by making the microperforations of different sizes over different transducers, thus adjusting the front volume acoustic impedance affecting each transducer. Again, the acoustic impedance could be further controlled by adjusting the sizes of the respective back volumes for each transducer, as described above.

With regard to frequency response, each transducer 101, 102 may be designed to provide a certain frequency response based on its design, its associated back volume 111, 112, the combined front volumes 104, 105, and the configuration of port 103 with which it will be used. In addition, elements such as structures 106, 107, 116, 117, which may be passive, may be placed adjacent respective transducers 101, 102 to affect the frequency response. Such elements may be placed in front volumes 104, 105 (elements 106, 107) or back volumes 111, 112 (elements 116, 117).

Finally, as discussed above, each transducer 102, 101 may function as an element affecting the frequency response of the other transducer 101, 102, and that effect must be taken into account in designing the frequency response of each transducer 101, 102 and the characteristics of any additional elements 106, 107, 116, 117.

Thus it is seen that in a device having more than one acoustic transducer, where two or more transducers share one acoustic port, the acoustic properties of each transducer can be matched to the acoustic properties of the port. It will be understood that the foregoing is only illustrative of the principles of the invention, and that various modifications can be made by those skilled in the art without departing from the scope and spirit of the invention, and the present invention is limited only by the claims that follow.

What is claimed is:

1. An audio device comprising:
  a housing;
  an acoustic port in said housing; and
  a plurality of acoustic transducers sharing said acoustic port; wherein:
  said acoustic port has at least one acoustic property;
  each of said plurality of acoustic transducers has at least one of said at least one acoustic property; and
  said at least one of said at least one acoustic property of each of said plurality of acoustic transducers is matched to a corresponding one of said at least one acoustic property of said acoustic port.

2. The audio device of claim 1 wherein said at least one acoustic property comprises acoustic impedance.

3. The audio device of claim 2 wherein said acoustic impedance is matched to create acoustic resonance.

4. The audio device of claim 2 further comprising:
at least one front volume between said acoustic port and said plurality of acoustic transducers; wherein:
each said at least one front volume is configured to match acoustic impedance of said plurality of acoustic transducers to acoustic impedance of said acoustic port.

5. The audio device of claim 4 further comprising:
a respective front volume between said port and each respective one of said plurality of acoustic transducers; wherein:
each said respective front volume is configured to match the acoustic impedance of said respective one of said plurality of acoustic transducers to acoustic impedance of said port.

6. The audio device of claim 4 further comprising:
at least one back volume between said housing and said plurality of acoustic transducers; wherein:
each said at least one back volume is configured to match the acoustic impedance of said plurality of acoustic transducers to the acoustic impedance of said port.

7. The audio device of claim 2 further comprising:
a respective back volume between said housing and each respective one of said plurality of acoustic transducers; wherein:
each said respective back volume is configured to match the acoustic impedance of said respective one of said plurality of acoustic transducers to acoustic impedance of said port.

8. The audio device of claim 2 wherein said at least one acoustic property further comprises frequency response.

9. The audio device of claim 8 further comprising a respective element in acoustic relationship with at least one respective one of said plurality of acoustic transducers; wherein:
said respective element is designed to adjust frequency response of said respective one of said plurality of acoustic transducers, thereby adjusting at least one of (a) frequency response and (b) acoustic impedance, of one or more of (1) said acoustic port and (2) at least one other of said plurality of acoustic transducers.

10. The audio device of claim 9 wherein:
each of said acoustic transducers is said respective element for said at least one other of said plurality of acoustic transducers.

11. The audio device of claim 1 wherein said at least one acoustic property comprises frequency response.

12. The audio device of claim 11 further comprising a respective element in acoustic relationship with at least one respective one of said plurality of acoustic transducers; wherein:
said respective element is designed to adjust frequency response of said respective one of said plurality of acoustic transducers, thereby adjusting frequency response of one or more of (1) said acoustic port and (2) at least one other of said plurality of acoustic transducers.

13. The audio device of claim 12 wherein:
each of said acoustic transducers is said respective element for said at least one other of said plurality of acoustic transducers.

14. The audio device of claim 1 wherein said plurality of acoustic transducers comprises two acoustic transducers.

15. The audio device of claim 14 wherein:
said device is a mobile telephone; and
said plurality of acoustic transducers comprises a receiver speaker and a handsfree speaker.

16. A method of tuning at least one acoustic property of an audio device, said audio device including a housing, an acoustic port in said housing, and a plurality of acoustic transducers sharing said acoustic port, wherein said acoustic port has at least one acoustic property and each of said plurality of acoustic transducers has at least one of said at least one acoustic property; said method comprising:
matching said at least one of said at least one acoustic property of each of said plurality of acoustic transducers to a corresponding one of said at least one acoustic property of said acoustic port.

17. The method of claim 16 wherein said at least one acoustic property comprises acoustic impedance.

18. The method of claim 17 wherein said matching comprises creating acoustic resonance.

19. The method of claim 17 wherein said matching comprises configuring at least one front volume between said acoustic port and said plurality of acoustic transducers to match the acoustic impedance of said plurality of acoustic transducers to the acoustic impedance of said acoustic port.

20. The method of claim 19 wherein said configuring at least one front volume comprises adjusting at least one of size and shape of said at least one front volume.

21. The method of claim 19 wherein said matching comprises configuring a respective front volume between said port and each respective one of said plurality of acoustic transducers to match the acoustic impedance of said respective one of said plurality of acoustic transducers to the acoustic impedance of said port.

22. The method of claim 19 wherein said matching further comprises configuring at least one back volume between said housing and said plurality of acoustic transducers to match the acoustic impedance of said plurality of acoustic transducers to the acoustic impedance of said port.

23. The method of claim 22 wherein said configuring at least one back volume comprises adjusting at least one of size and shape of said at least one back volume.

24. The method of claim 22 wherein said configuring at least one back volume comprises venting said at least one back volume.

25. The method of claim 17 wherein said matching comprises configuring a respective back volume between said housing and each respective one of said plurality of acoustic transducers to match the acoustic impedance of said respective one of said plurality of acoustic transducers to acoustic impedance of said port.

26. The method of claim 17 wherein said at least one acoustic property further comprises frequency response.

27. The method of claim 26 wherein said matching comprises configuring a respective element in acoustic relationship with at least one respective one of said plurality of acoustic transducers to adjust frequency response of said respective one of said plurality of acoustic transducers, thereby adjusting at least one of (a) frequency response and (b) acoustic impedance, of one or more of (1) said acoustic port and (2) at least one other of said plurality of acoustic transducers.

28. The method of claim 27 wherein said matching further comprises configuring each of said acoustic transducers as said respective element for said at least one other of said plurality of acoustic transducers.

29. The method of claim 16 wherein said at least one acoustic property comprises frequency response.

30. The method of claim 29 wherein said matching further comprises:
 designing an element to adjust frequency response of one of said plurality of acoustic transducers, thereby adjusting frequency response of one or more of (1) said acoustic port and (2) at least one other of said plurality of acoustic transducers; and
 locating said element in acoustic relationship with said at least one of said plurality of acoustic transducers.

31. The method of claim 30 wherein said matching comprises:
 designing a respective element to adjust frequency response of a respective one of said plurality of acoustic transducers, thereby adjusting frequency response of one or more of (1) said acoustic port and (2) at least one other of said plurality of acoustic transducers; and
 locating said respective element in acoustic relationship with at least one respective one of said plurality of acoustic transducers.

* * * * *